No. 880,106. PATENTED FEB. 25, 1908.
J. J. SHIMEK.
CONVERTIBLE HEATING AND COOKING STOVE.
APPLICATION FILED JUNE 4, 1906.
2 SHEETS—SHEET 1.
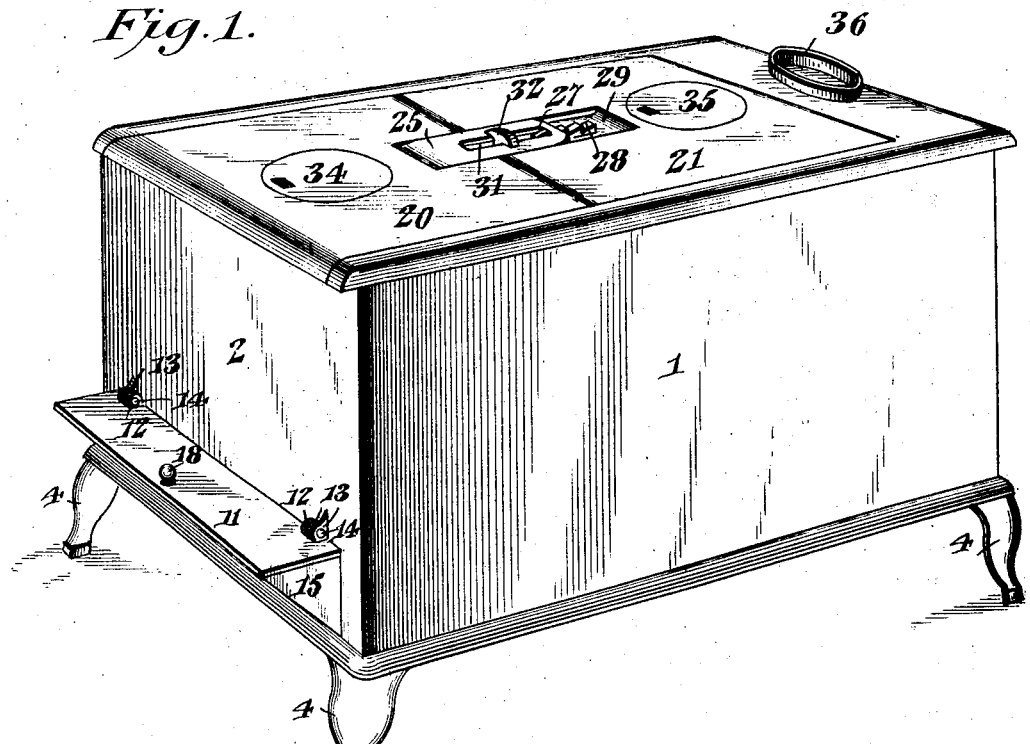
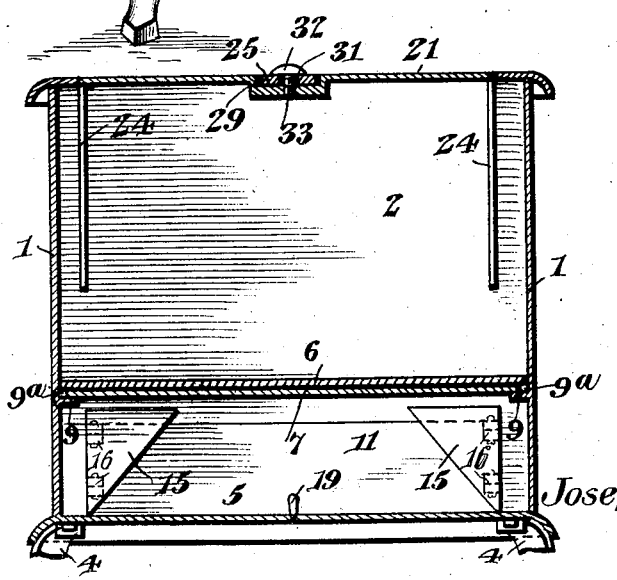
Joseph J. Shimek,
Inventor No. 880,106. PATENTED FEB. 25, 1908.
J. J. SHIMEK.
CONVERTIBLE HEATING AND COOKING STOVE.
APPLICATION FILED JUNE 4, 1906.
2 SHEETS—SHEET 2.
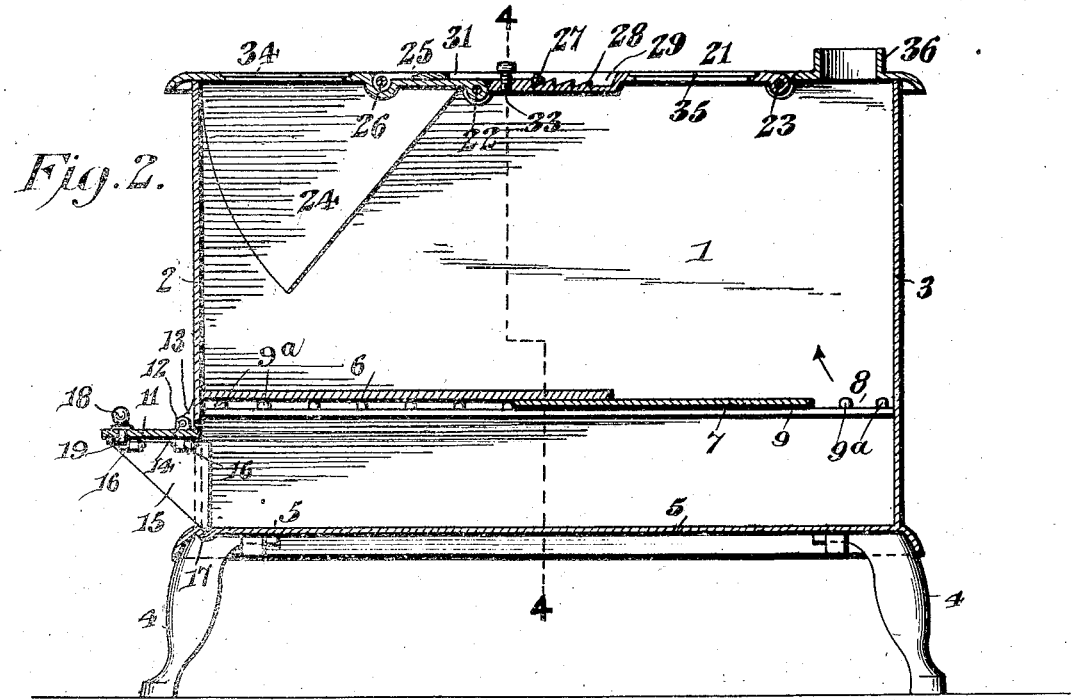
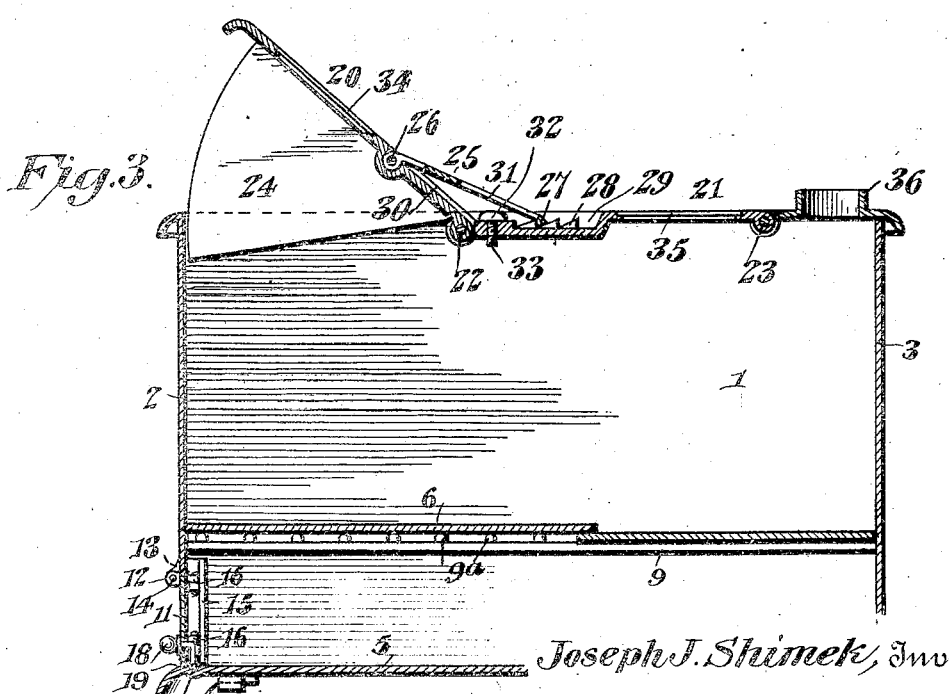
Joseph J. Shimek, Inventor
Witnesses

UNITED STATES PATENT OFFICE.

JOSEPH J. SHIMEK, OF CUBA, KANSAS.

CONVERTIBLE HEATING AND COOKING STOVE.

No. 880,106.  Specification of Letters Patent.  Patented Feb. 25, 1908.

Application filed June 4, 1906. Serial No. 320,105.

*To all whom it may concern:*

Be it known that I, JOSEPH J. SHIMEK, a citizen of the United States, residing at Cuba, in the county of Republic and State of Kansas, have invented a new and useful Convertible Heating and Cooking Stove, of which the following is a specification.

The invention relates to a convertible cooking and heating stove.

The object of the present invention is to improve the construction of stoves, and to provide a convertible cooking and heating stove of simple and comparatively inexpensive construction, adapted to be easily changed into either a cooking or heating stove without removing any of the parts.

A further object of the invention is to provide a stove of this kind, which, when arranged for cooking, will prevent the heat from being carried directly to the stove pipe, and which, when arranged for heating, will afford a maximum amount of heat and enable either a wood or coal fire to be left unattended for a considerable length of time with perfect safety and without liability of the fire becoming extinguished.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a convertible cooking and heating stove, constructed in accordance with this invention and arranged for cooking. Fig. 2 is a longitudinal sectional view of the same. Fig. 3 is a longitudinal sectional view, the stove being arranged as a heater. Fig. 4 is a transverse sectional view on the line 4—4 of Fig. 2.

Like numerals of reference designate corresponding parts in all the figures of the drawings.

1—1 designate vertical side walls of a substantially oblong stove, which is provided with front and rear end walls 2 and 3.

The stove, which is designed for use both as a cooking stove and a heater, is preferably supported above the floor by legs 4, which are suitably secured to the bottom 5 of the stove, but when the stove is arranged as a heater, it may be placed directly upon the floor without danger, as the lower portion of the stove will not become excessively heated, as hereinafter more fully explained.

The casing of the stove may be constructed of any suitable material, and may be plain or of any ornamental design, and stoves of any desired size may be constructed.

The stove is divided into an upper combustion chamber or compartment and a lower ash pit by means of a grate composed of front and rear imperforate sections 6 and 7, the rear section 7 being slidable and adjustable to provide a rear opening 8, as illustrated in Fig. 2 of the drawings, and also to close such opening, as illustrated in Fig. 3 of the drawings, by arranging the rear section contiguous to the rear wall to form a support or false bottom. The rear section 7, which is located in a plane below the front section, is arranged in horizontal guides 9, consisting of horizontal ribs or flanges. The rear section 7 of the grate is slidable freely in the guides or ways 9, and the front section 6 is preferably supported upon lugs $9^a$, which project above the ribs or flanges 9.

When the grate is arranged to provide a rear opening as shown in Fig. 2 of the drawings, the draft is admitted below the grate at the front of the stove, which is provided with a door 11, hinged at the upper edge and extending across the stove within a short distance of each side of the same. The door is provided at its upper edge with suitable ears 12, and is connected with corresponding ears 13 of the front wall of the body of the stove by means of suitable pintles 14. The door 11, which is adapted to swing upwardly from a vertical position to a horizontal position, is supported in the latter position by sides or wings 15, which coöperate with the door to form a projecting conduit or inlet for the air. The sides or wings 15, which are substantially triangular, are connected with the inner face of the door 11 at the ends thereof by suitable hinges 16, which permit the sides or wings 15 to fold against the inner face of the door 11, when the latter is closed, as clearly shown in Fig. 4 of the drawings. The sides or wings are also adapted to engage a groove 17 in the bottom 5 of the stove, as clearly shown in Fig. 2, whereby the door 11 is locked in an open position. The hinges 16, which connect the sides or wings 15 with the door 11, enable the said sides or wings to be readily engaged with and disengaged from the groove 17 of the bottom of the stove.

When the lower draft door 11 is open, air is admitted beneath the grate, and it passes upward into the upper compartment or combustion chamber of the stove, and as the cold air is not admitted to the combustion chamber at the front of the stove, and does not pass across the top of the fire between the same and the top of the stove, it does not drive the heat to the chimney or chill the top of the stove, as is the case with the stove of the ordinary construction. The upper draft at the back of the stove is sufficient to support combustion, and it serves to drive heat upwardly against the top of the stove, whereby the latter is intensely heated and is rendered more effective for cooking purposes than the top of an ordinary stove. Furthermore the upward passage of the draft at the back of the stove operates in a measure to confine the heat within the combustion chamber, and prevents a too rapid burning of the fuel.

When the stove is arranged for heating, the grate is closed and the fire is built upon the grate, the draft being admitted at the top of the stove, as shown in Fig. 3 of the drawing. This arrangement forms a heating stove of the upper portion of the body. The front draft door is closed and may be securely locked in such position by a fastening device 18 having a lug or engaging portion 19 for engaging the groove 17 of the bottom of the stove.

The top of the stove is provided with front and rear sections or members 20 and 21, which are connected together by a suitable hinge joint 22, whereby the front section or member 2 is adapted to be swung upward, as indicated in Fig. 3 of the drawings, to provide the necessary draft and also to afford access to the fire when the stove is arranged for cooking purposes. By raising the front section or member of the top of the stove, the latter may be used for toasting, broiling, and the like. The front section or member 20 is also raised for introducing fuel into the stove and both sections are adapted to be swung upward on the hinge joint 23 of the rear section or member to open the inner top of the stove to permit large logs, or other large pieces of fuel to be conveniently placed in the stove. The front section or member 20 is provided at opposite sides of the stove with sides or wings 24, which are sector-shaped or substantially triangular, and which coöperate with the front section or member 20 of the top to provide a projecting conduit or inlet for the air. The hinge joint 23 of the rear section connects the rear end of the latter to the stove at the back thereof, and the front section or member, when raised, is secured in its adjustment by means of a dog 25, consisting of a plate or bar, pivoted or hinged at its front end 26 to the front section or member 20 at a point between the ends thereof, and provided at its rear end with a depending or downwardly extending tooth or engaging portion 27, which is adapted to engage a ratchet 28, consisting of a longitudinal series of ratchet teeth arranged in a groove or recess 29 of the rear section or member 21, and located below the upper face of the same. The front section or member 20 is provided with a groove or recess 30 to receive the pivoted dog, which preferably has its upper face flush with the upper faces of the sections or members 20 and 21, when the latter are in a horizontal position, as illustrated in Figs. 1 and 2 of the drawings. The front faces of the ratchet teeth of the rear section are inclined or beveled and the rear engaging faces of the teeth are vertical to form shoulders. The pivoted or hinged dog slides freely over the ratchet, when the front section is raised, and the tooth 27 drops into engagement with the teeth 28, which may be of any desired number.

The dog is provided with a longitudinal slot 31 to receive the head 32 of a pivoted locking device, which consists of a screw having an oblong head, which is adapted to be turned either longitudinally or transversely of the dog. When the head of the locking device is arranged longitudinally of the slot of the dog, the front section or member 20 is adapted to be raised and lowered independently of the rear section, but when the head of the locking device is arranged transversely of the slot and engages the dog, the front and rear sections or members 20 and 21 are rigidly connected, and when the front section or member is raised, it swings upwardly with the rear section or member on the hinge joint of the latter. The locking device is turned to the right to engage it with the dog, and the threaded shank or screw portion 33 is arranged in a threaded perforation of the rear section, and is moved inward by such rotary movement of the head 32, whereby the locking device frictionally engages the dog and is held against accidental unscrewing.

The front and rear sections or members 20 and 21 are provided with stove holes, and have suitable lids 34 and 35, which may be of any desired number and arrangement, and the back of the stove is provided with an opening and with a projecting flange 36 to receive a stove pipe.

When it is desired to provide a stove for heating only, a cheap and effective heater may be constructed by omitting the grate and building the fire directly upon the bottom of the stove. When, however, the stove is arranged as a heater and the fire is built upon the closed grate, the body of the stove may be arranged directly upon the floor, as the lower compartment will not become excessively heated.

Having thus fully described my invention, what I claim as new and desire to secure by Letters Patent, is:—

1. A convertible heating and cooking stove provided with a top having a hinged section adapted to form an air inlet, said top being also provided at the back with a smoke outlet, a grate having a movable section or member arranged to form a rear opening and adapted to close the same, and a door arranged below the grate.

2. A convertible heating and cooking stove provided with a top having a front hinged section adapted to form an air inlet, a grate having an adjustable section or member movable toward and from the back of the stove to provide a rear opening and also to close the same, said stove having a smoke outlet located at the rear end of the top of the stove at a point above the rear opening of the grate, and a door located below the grate.

3. In a convertible heating and cooking stove, the combination of a body provided at the top with a hinged section or member adapted to be raised, and having depending sides or wings coöperating with the hinged section when the latter is open to form an air conduit, said sides or wings forming side walls for the said conduit, means for supporting the hinged section or member in its raised position, and a grate located at an intermediate point between the top and bottom of the stove and having an opening and provided with means for closing it to form a heating stove of the upper portion of the body.

4. In a convertible heating and cooking stove, the combination of a body provided at the top with front and rear sections or members hinged together, the rear section or member being also hinged to the body of the stove, means for rigidly connecting the sections or members to permit the same to swing upwardly on the hinge joint, which connects the rear section or member to the body, and a grate located at an intermediate point between the top and bottom of the stove and provided with means for cutting out the lower portion of the said stove.

5. In a convertible heating and cooking stove, the combination of a body provided at the top with front and rear sections or members hinged together, the rear section or member being also hinged to the body of the stove, means for rigidly connecting the sections or members to permit the same to swing upwardly on the hinge joint, which connects the rear section or member to the body, said means comprising a pivoted dog mounted on one of the sections and engaging the other, and a locking device carried by the latter section for engaging the dog, and a grate located at an intermediate point between the top and bottom of the stove and provided with means for cutting out the lower portion of the said stove.

6. In a convertible heating and cooking stove, the combination of a body provided at the top with front and rear sections or members hinged together, the rear section or member being also hinged to the body of the stove, means for rigidly connecting the sections or members to permit the same to swing upwardly on the hinge joint, which connects the rear section or member to the body, said means comprising a dog pivoted to one of the sections or members and provided with a slot and arranged to engage the other section or member, and a pivoted locking device mounted on the latter section or member and operable in the slot of the dog to engage and release the same, and a grate located at an intermediate point between the top and bottom of the stove and provided with means for cutting out the lower portion of the said stove.

In testimony that I claim the foregoing as my own, I have hereto affixed my signature in the presence of two witnesses.

JOSEPH J. SHIMEK.

Witnesses:
 JOHN H. SIGGERS,
 A. B. SHIMEK.